Patented Dec. 22, 1942

2,305,828

UNITED STATES PATENT OFFICE 2,305,828

DRY TRITURATION

Alfred Kuhn, Radebeul-Dresden, Germany; vested in the Alien Property Custodian

No Drawing. Application March 21, 1938, Serial No. 197,311. In Germany March 23, 1937

1 Claim. (Cl. 167—82)

This invention relates to a process for the production of triturations from fresh plants, and also from parts of plants and animal substances, and relates more particularly to the employment of soluble or insoluble, physiologically tolerable substances as distributing agents. Such agents preferably comprise common salt, or other saline mixtures, and also plant components containing crude fibres, such as straw, husks or chaff of cereals, bran, in the presence (if desired) of sugars and/or neutralising, alkalising or acidifying substances, whilst, by virtue of the selection or certain saline mixtures—preferably by employing electrolyte-buffer mixtures—it is possible to maintain a predetermined hydrogen-ion concentration. It is known to triturate plants, or parts of same, with sugars for the purpose of obtaining preparations suitable for therapeutic application, and it is also known to triturate the fresh plants, or parts of same, with sugars and to transform the resulting triturations into suitable therapeutic preparations by means of definitely conducted drying processes in a current of air, the humidity of which steadily diminishes as the drying of the trituration progresses. It is advisable to perform the drying with air, or inert gases, at temperatures not exceeding 30° C. The sugars specified comprised crystallisable sugars, such as milk sugar, cane sugar, or also sugars that crystallise only with difficulty or not at all, such as grape sugar and mixtures of same.

In contradistinction to the known state of the art, it has now been ascertained, in accordance with the invention, that the joint addition of plant components rich in crude fibres, as triturating medium, enables the drying period to be considerably still further reduced. It has also transpired that therapeutically valuable triturations are obtained when resorbable carbohydrates are omitted from the triturations, being replaced by substances which are soluble, or insoluble, in saliva and other corporeal fluids. These substances do not need to be capable, in the solid state, of acting as absorbents of the substances contained in the plants, it being sufficient for them to be triturable and physiologically tolerable. For example, according to the present invention, it is possible to triturate a fresh plant by the methods prescribed for homeopathic trituration, with common salt, or magnesia, calcium carbonate and/or a mixture of primary and secondary sodium phosphate with a definite hydrogen-ion concentration. The technical advantage of this method of operating is to be regarded as consisting in the fact that the triturating enables the substances contained in the plants or organs—such as the mucous membrane of the stomach and intestines, brain substance and the like—to be effectually conserved and dosed without sugars having been added, with the result that the resulting therapeutic preparations are tolerable, even by the diabetic.

Consideration of the phenomena occurring during the trituration of the fresh plant, or animal raw material, such as animal liver with common salt, will show that the alternating osmotic action will lead to the extraction of juices from the organs, so that the moisture content of the organic matter is reduced and it can therefore be more easily dried than the more humid original system. A portion of the water combined in the organic substances is liberated and escapes therefrom, being thus readily removable. Moreover, in the phase richer in water, a large portion of the trituration medium, for example the electrolyte-buffer mixture, and therefore two kinds of phosphate will pass into solution. Such solution, in turn, has a high osmotic pressure which has a preservative effect.

The idea underlying the production of such triturations is that through the preparation of mixtures of therapeutically active substances with distributing media, the physiologically active substances are retained, practically unaltered, in the preparation which is not the case in the production of infusions, tinctures, extracts and similar preparations.

It should be noted that, in the method of the present invention, no solutions are employed, nor are any extracts obtained. Of course, the triturations can also be produced by first obtaining a trituration with sugar, in known manner, in order to take advantage of the preservative properties of sugar during the operation, the resulting mixture then receiving, prior to being dried, additions of finely ground parts of plants, such as straw, husks, bran and the like, or also salts, or saline mixtures, which may also be capable of maintaining a definite hydrogen-ion concentration.

The present invention not only enables fresh plants, or parts of same, or drugs, to be worked up into valuable preparations as hitherto, but also makes it possible to work up substances of animal origin in the same manner and obtain medicinal preparations therefrom. Thus, bones and also other corporeal substances, such as glandular organs, the mucous membrane of the stomach and intestines, and brain substance, can be worked up in this manner.

It may be mentioned that, up to the present, it has been impossible to produce, on a manufacturing scale, a bone meal from fresh bones still containing the embedded proteids, fat and marrow. The products commercially known as bone meal consist of bones from which the proteids and fats have been extracted, and have merely an extremely low biological value.

On the contrary, the present invention enables a trituration of bones to be produced, in which all the constituents—embedded proteids, fat and marrow—of the fresh bones are retained. In operating in accordance with the present invention, the fats, in particular, of the animal materials are preserved in a manner which prevents them from becoming so rancid as in the case of the usual treatment and, in addition, the proteids also can be worked up, by the method of the present invention, in such a manner as to furnish practically inodorous preparations—which has not heretofore been possible.

The distributing media suitable for this purpose are the same as have been previously employed for the treatment of fresh plants, or parts of plants, viz. sugars, such as grape sugar, milk sugar, and honey. Prior to drying, and preferably already during trituration, salts such as common salt, or saline mixtures—such as salts physiologically analogous to blood serum—and/or substances with an alkaline reaction, may also be added. Such substances comprise buffer salts, or electrolyte buffer salts with an alkaline reaction. Finally, the trituration may also be performed in the presence of amorphous polysaccharides—such as tragacanth, pectin, starch, amylose, and their degradation products, such as dextrin—which are preferably insoluble in water, but swell up therein.

Example I 10 kg. of folia Salviae are disintegrated in a roller mill with 10 kg. of a mixture of 80% of grape sugar and 20% of finely ground wheaten chaff, and are dried in a current of air of diminishing humidity.

Example II 10 kg. of folia *belladonnae* are finely disintegrated in the roller mill with 10 kg. of straw (ground extremely fine) and 150 grms. of citric acid, and are dried in a current of cold air of diminishing humidity.

Example III 10 kg. of folia *Menthae pip.* are disintegrated with 10 kg. of common salt in the roller mill, and dried in a current of cold air of diminishing humidity.

Example IV 10 kg. of radix *Pimpinellae* are finely disintegrated with 10 kg. of a mixture of 97% of common salt and 3% of sodium bicarbonate and dried, as in the case of Example I.

Example V 10 kg. of radix *belladonnae* and 20 kg. of a mixture of 97% of common salt and 3% of citric acid, are disintegrated and dried as in Example I.

Example VI 10 kg. of folia *Eucalypti* and 2 kg. of a mixture of 50% of common salt and 50% of grape sugar, are disintegrated and dried as in Example I. Leaves containing 80% of water furnish a trituration consisting of equal proportions of dry plant material and distributing medium.

Example VII 10 kg. of herba Thymi and 10 kg. of a mixture of 97% of grape sugar and 3% of calcium carbonate, are disintegrated and dried as in Example I.

Example VIII 20 kg. of radix Inulae and 20 kg. of a mixture containing 77% of grape sugar, 20% of common salt and 3% of tartaric acid, are disintegrated and dried as in Example I.

Example IX 10 kg. of radix Imperatorae and 10 kg. of bran are ground extremely fine in an edge-runner mill and dried in a current of cold air of diminishing humidity.

Example X 25 kg. of herba *Menthae pulegium* and 5 kg. of a mixture containing 97% of bran and 3% of magnesium carbonate are disintegrated in a meat mincer and dried in a current of cold air.

Example XI 10 kg. of herba Conii and 10 kg. of a mixture containing 97% of bran and 3% of tartaric acid, are disintegrated in the roller mill and dried, as in Example I.

Example XII 10 kg. of folia *belladonnae* and 10 kg. of a mixture containing 60% of grape sugar and 40% of bran, are disintegrated in the roller mill and dried in a current of cold air.

Example XIII 50 kg. of flores Lavandulae and 25 kg. of a mixture containing 60% of bran, 37% of grape sugar and 3% of sodium bicarbonate, are disintegrated in an edge-runner mill and dried in a current of cold air.

Example XIV 10 kg. of tubera *Aconiti* and 10 kg. of a mixture containing 50% of ground grain husks, 40% of cane sugar and 2% of citric acid, are disintegrated in an edge-runner mill and dried in a current of cold air.

Example XV 5 kg. of *Mentha absintii* and 5 kg. of a mixture containing 95% of milk sugar and 5% of primary potassium phosphate and secondary sodium phosphate (1:1), are finely disintegrated in the roller mill and dried in a current of cold air of diminishing humidity. The pH value of the inert distributing medium is about 6.

Example XVI 10 kg. of radix *belladonnae* and 10 kg. of a mixture containing 97% of milk sugar and 4% of a mixture of tartaric acid and sodium tartrate (1:32) are finely disintegrated in a roller mill and dried in a current of cold air.

Example XVII 5 kg. of rhizoma Asari and 5 kg. of a mixture containing 97% of bran and 3% of a mixture (1:1) of primary potassium phosphate and secondary sodium phosphate, are disintegrated and dried. The distributing medium has the pH value 6.

Example XVIII 20 kg. of flores Chamomillae and a mixture containing 50% of cane sugar, 47% of bran and 3% of a mixture of primary potassium phosphate (97.5%) and secondary sodium phosphate (2.5%), are disintegrated and dried. The distributing medium has the pH value 8.

Example XIX 10 kg. of testes and 10 kg. of common salt are disintegrated in the roller mill and dried in a current of cold air of diminishing humidity.

Example XX 10 kg. of liver and 10 kg. of a mixture containing 97% of common salt and 3% of sodium bicarbonate are finely disintegrated and dried as in Example I.

Example XXI 20 kg. of thyroids and 20 kg. of a mixture containing 97% of common salt and 3% of citric acid, are disintegrated and dried as in Example I.

Example XXII 5 kg. of suprarenal glands and 1 kg. of a mixture of common salt and grape sugar in equal parts, are disintegrated and dried as in Example I.

Example XXIII 10 kg. of ovaries and 10 kg. of a mixture containing 97% of grape sugar and 3% of calcium carbonate, are disintegrated and dried as in Example I.

Example XXIV 20 kg. of testes and 20 kg. of a mixture containing 77% of grape sugar, 20% of common salt and 3% of tartaric acid, are disintegrated and dried as in Example I.

Example XXV 10 kg. of liver and 10 kg. of bran are finely disintegrated in an edge-runner mill and dried in a current of cold air of diminishing humidity.

Example XXVI 25 kg. of thyroids and 5 kg. of a mixture containing 97% of bran and 3% of magnesium carbonate, are disintegrated in a meat mincer and dried in a current of cold air.

Example XXVII 5 kg. of suprarenal glands and 5 kg. of a mixture containing 97% of bran and 3% of tartaric acid are disintegrated in a roller mill and dried as in Example I.

Example XXVIII 10 kg. of ovaries and 10 kg. of a mixture containing 60% of grape sugar and 40% of bran are disintegrated in a roller mill and dried in a current of cold air.

Example XXIX 50 kg. of testes and 25 kg. of a mixture containing 60% of bran, 37% of grape sugar and 3% of sodium bicarbonate, are disintegrated in an edge-runner mill and dried in a current of cold air.

Example XXX 10 kg. of liver and 10 kg. of a mixture containing 50% of ground grain husks, 48% of cane sugar and 2% of citric acid, are disintegrated in an edge-runner mill and dried in a current of cold air.

Example XXXI 5 kg. of thyroids and 5 kg. of a mixture containing 95% of milk sugar and 5% of primary potassium phosphate and secondary sodium phosphate (1:1), are finely disintegrated in a roller mill and dried in a current of cold air of diminishing humidity. The pH value of the inert distributing medium is about 6.

Example XXXII 5 kg. of suprarenal glands and 5 kg. of a mixture containing 97% of milk sugar and 3% of a mixture (1:32) of tartaric acid and sodium tartrate, are finely disintegrated in a roller mill and dried in a current of cold air.

Example XXXIII 5 kg. of ovaries and 5 kg. of a mixture containing 97% of bran and 3% of a mixture of primary potassium phosphate and secondary sodium phosphate (1:1), are disintegrated and dried. The distributing medium has the pH value 6.

Example XXXIV 20 kg. of testes and a mixture containing 50% of cane sugar, 47% of bran and 3% of a mixture of primary potassium phosphate (97.5%) and secondary sodium phosphate (2.5%), are disintegrated and dried. The distributing medium has the pH value 8.

I claim:

A process for the production of dry triturations which comprises triturating fresh plants with cereal husks, and subsequently drying the trituration in the presence of air, the humidity of which diminishes as the drying of the trituration progresses.

ALFRED KUHN.